US012214325B1

(12) United States Patent
Calvo

(10) Patent No.: US 12,214,325 B1
(45) Date of Patent: Feb. 4, 2025

(54) SYSTEM FOR STORING, PROCESSING, AND EXPELLING A FORMULATION

(71) Applicant: Joseph J Calvo, Miami, FL (US)

(72) Inventor: Joseph J Calvo, Miami, FL (US)

( * ) Notice: Subject to any disclaimer, the term of this patent is extended or adjusted under 35 U.S.C. 154(b) by 357 days.

(21) Appl. No.: 17/743,324

(22) Filed: May 12, 2022

Related U.S. Application Data

(60) Provisional application No. 63/187,780, filed on May 12, 2021.

(51) Int. Cl.
*B01F 31/00* (2022.01)
*B01F 33/84* (2022.01)
*B01F 101/21* (2022.01)

(52) U.S. Cl.
CPC .......... *B01F 33/8442* (2022.01); *B01F 31/56* (2022.01); *A45D 2200/207* (2013.01); *B01F 2101/21* (2022.01)

(58) Field of Classification Search
CPC .... A45D 2200/207; B01F 31/30; B01F 31/56
USPC .............................. 366/108, 110–112; 401/4
See application file for complete search history.

(56) References Cited

U.S. PATENT DOCUMENTS 1,594,636 A 8/1926 Smith
1,818,281 A 8/1931 Soss
2,383,967 A 9/1945 Hernon
2,819,723 A 5/1955 Meyer
2,737,190 A 3/1956 Magnusson et al.
2,771,890 A 11/1956 Jaberg
2,998,822 A 6/1959 Birch et al.
RE25,585 E 5/1964 Birch et al.
3,539,156 A * 11/1970 Zipperer ................. B01F 35/42 366/116
3,877,178 A * 4/1975 Campanelli ........... B24B 31/073 366/128
3,960,160 A 6/1976 Hogan
3,997,972 A * 12/1976 Jaunarajs ............... B43K 17/00 33/18.1
4,121,602 A 10/1978 Young
(Continued)

FOREIGN PATENT DOCUMENTS

GB 191109638 2/1912
KR 100768540 12/2007
WO WO2009015802 1/2011

*Primary Examiner* — David P Angwin
*Assistant Examiner* — Bradley S Oliver
(74) *Attorney, Agent, or Firm* — Malloy & Malloy, P.L.; Jennie S. Malloy

(57) ABSTRACT

A processor-applicator system configured for the processing of at least one, and in some instance a plurality of compounds into a formulation for the subsequent expulsion therefrom. Such a system may comprise an applicator system and an intermediate section, the latter of which may house at least one cartridge having at least one compound disposed therein. Such cartridge may be disposed in mechanical relation to a vibratory component and a projectile chamber, each of which may effectuate a transfer of kinetic energy onto the at least one cartridge, thereby effectuating various changes to the compound therein, and resulting in the withdrawal of at least a portion of such compound into a reservoir of the applicator system for the subsequent expulsion therefrom. Such a system may be configured for use in a variety of fields, such as cosmetics, pharmaceuticals, beverages, and foodstuffs, and thus may operate with a plurality of compounds.

20 Claims, 6 Drawing Sheets

(56) References Cited

U.S. PATENT DOCUMENTS

| | | | | |
|---|---|---|---|---|
| 4,202,361 | A | 5/1980 | Bills | |
| 4,213,423 | A | 7/1980 | Bryan et al. | |
| 4,520,831 | A | 6/1985 | Schumann et al. | |
| 4,619,532 | A * | 10/1986 | Schmidt, III | B01F 31/265 D15/147 |
| 4,792,250 | A | 12/1988 | Turner | |
| 4,792,602 | A | 12/1988 | Narang et al. | |
| 4,902,154 | A | 2/1990 | Valenza | |
| 5,054,504 | A | 10/1991 | Winrow | |
| 5,076,298 | A | 12/1991 | Busch et al. | |
| 5,119,838 | A | 6/1992 | Nakazima | |
| 5,215,106 | A | 6/1993 | Choi | |
| 5,241,974 | A | 9/1993 | Tsai | |
| 5,261,427 | A | 11/1993 | Dolev | |
| 5,622,192 | A * | 4/1997 | Chiou | A46B 11/0058 222/509 |
| 5,762,433 | A | 6/1998 | Cary | |
| 5,875,928 | A | 3/1999 | Muller et al. | |
| 5,927,290 | A | 7/1999 | Thiruppathi | |
| 6,357,450 | B1 | 3/2002 | Paice | |
| 6,877,924 | B1 | 4/2005 | Mears et al. | |
| 6,962,158 | B1 | 11/2005 | Anguelo | |
| 7,261,108 | B2 | 8/2007 | Dallianis et al. | |
| 7,322,363 | B1 | 1/2008 | Dillard | |
| 7,465,114 | B2 * | 12/2008 | Kress | A45D 40/262 401/129 |
| 7,530,358 | B2 | 5/2009 | Elliott | |
| 7,814,917 | B2 | 10/2010 | Hurwitz | |
| 8,033,746 | B2 * | 10/2011 | Tsai | A45D 33/36 401/117 |
| 8,347,894 | B1 | 1/2013 | Stewart et al. | |
| 8,777,132 | B2 | 7/2014 | Isaacs | |
| 8,888,390 | B2 * | 11/2014 | Gueret | A46B 15/0002 401/129 |
| 10,271,627 | B1 | 4/2019 | Calvo | |
| 12,029,300 | B1 | 7/2024 | Calvo | |
| 2003/0150126 | A1 | 8/2003 | Chang et al. | |
| 2003/0159306 | A1 | 8/2003 | Yeung | |
| 2005/0016559 | A1 | 1/2005 | Saida et al. | |
| 2006/0021627 | A1 | 2/2006 | Lee | |
| 2006/0042643 | A1 | 3/2006 | Delan | |
| 2008/0138138 | A1 | 6/2008 | Gueret | |
| 2008/0149124 | A1 | 6/2008 | McKay | |
| 2008/0202544 | A1 | 8/2008 | Hurwitz | |
| 2009/0025247 | A1 | 1/2009 | Yde et al. | |
| 2009/0101159 | A1 | 4/2009 | Bonnafous | |
| 2010/0186762 | A1 | 7/2010 | Spagnuolo | |
| 2011/0206445 | A1 | 8/2011 | Hurwitz | |
| 2011/0293680 | A1 | 12/2011 | Jo | |
| 2012/0224908 | A1 * | 9/2012 | Tang | A45D 34/041 401/4 |
| 2013/0048003 | A1 | 2/2013 | Antons | |
| 2013/0115183 | A1 | 5/2013 | Ko | |
| 2015/0059798 | A1 | 3/2015 | Mazed | |

* cited by examiner

SYSTEM FOR STORING, PROCESSING, AND EXPELLING A FORMULATION

BACKGROUND OF THE INVENTION

Claim of Priority

The present application is based on, and a claim of priority is made under 35 U.S.C. Section 119(e) to a provisional patent application in the U.S. Patent and Trademark Office, namely, that having Ser. No. 63/187,780 and a filing date of May 12, 2021, and which is incorporated herein by reference.

FIELD OF THE INVENTION

The present invention is directed to system configured for the processing and dispensing of a formulation optionally comprised of at least one, and in some instances several compounds, wherein such formulation may be directed to a plurality of applications including, without limitation, cosmetics, pharmaceuticals, beverages, and foodstuffs. In at least one embodiment of the invention, however, the system and/or device is directed to processing or blending a formulation and dispensing the same, such as on to a person's hair, scalp and/or skin to achieve various treatments. As described herein, the invention may, however, have other embodiments.

DESCRIPTION OF THE RELATED ART

Conventional systems configured for the application of a formulation, particularly in the realm of cosmetics, often comprise a simple apparatus designed to effectuate the expulsion of a single compound therefrom. Indeed, one formulation apparatuses are ubiquitous in a plurality of fields for wet, dry, and aerosol-based compounds, whether directed to cosmetics, pharmaceuticals, foodstuffs, or otherwise.

While several different applicator-types exist, one conventional applicator apparatus comprises a bulb-type applicator. Such an applicator generally exists for the application of a single formulation, and, as such, consists of simple application means. Generally speaking, such an applicator functions through a bulb, which, when compressed, operates to expel air from the area contained therein. Once force is no longer applied to the bulb by the user, the bulb reinflates, thereby drawing the formulation from its reservoir within such housing and into the interior volume of the bulb. And, upon a subsequent compression of such bulb, the formulation is subsequently expelled through an outlet, thereby applying such formulation to an intended area of application, such as a user's body.

Although such conventional applicators, whether automatic or requiring user actuation, and whether comprising a bulb applicator or otherwise, are generally effective for their intended purpose, such applicators do suffer from several different issues. One primary issue necessarily stems from the chemical composition of the formulation intended to be dispensed by such applicator. Specifically, because conventional applicators only dispense one formulation, such formulation is typically pre-prepared prior to disposition within such an applicator. However, in order to prevent, for instance, coagulation, caking, segmentation, or other chemical processes affecting the state in which such formulation resides—e.g., a change from a liquid state to a solid state, or the separation of the various chemical compounds of which such formulation is comprised, such as from a homogenous composition to a heterogenous composition—the formulation disposed within such conventional applicator is typically comprised of a plurality of compounds, at least some of which are configured to prevent the occurrence of such chemical processes.

However, the inclusion of such other compounds within such formulation necessarily changes the chemical composition thereof. And, generally speaking, such changes to the chemical composition of such formulation results in a decrease in quality thereof. For instance, regarding cosmetics, the inclusion of certain additional chemicals configured to prevent, for instance, coagulation and/or caking within the applicator may result in unwanted consequences to a user's skin or other anatomical features, such as, for instance, skin irritation. With respect to pharmaceuticals, such unnecessary chemicals may reduce the efficacy of the same, or otherwise serve to drive up costs. And with foodstuffs, it may be understood unnecessary chemical compounds may dilute flavors, or otherwise have negative effects to a person's health when ingested.

In a similar vein, because such conventional applicators are typically configured for use in connection with only one pre-prepared formulation, it may be understood such conventional applicators are not configured for bonding a plurality of disparate and interchangeable compounds, particularly wherein such bonding occurs at the molecular level. Consequently, such conventional applicators are thus necessarily limited in terms of the formulations available to be dispensed therefrom, thereby naturally leading to unnecessary economic waste as each specific formulation thus requires a specific applicator therefor. Likewise, consumers are consequently restricted to only those formulations actually manufactured and sold by corporations. As a result, consumers often experience difficulty in sourcing specific formulations particularly suited for their needs. For instance, in the realm of cosmetics, such as makeup, consumers often experience difficulty in finding a color compound optimally matching his or her skin tone, a problem resulting, at least in part, due to the ubiquitous nature of single-formulation applicators.

As such, there exists a need in the art for an applicator apparatus configured to enable the generation of a formulation from only pure, natural compounds, thereby reducing or otherwise vitiating the need for additional compounds included for the sole purpose of retaining a formulation within a chemical state sufficient for application. If any such solution were developed, it should seek to retain at least one compound in a natural state when such applicator is not being used but should further be configured to enable a user to easily blend a plurality of compounds into a formulation immediately prior to the application thereof. Also if any such solution were developed, it should further be configured to enable users to selectively use a plurality of compounds in connection with such an applicator, such that users may utilize the applicator apparatus in connection with a variety of fields including, without limitation, cosmetics, pharmaceuticals, beverages, and foodstuffs. In conjunction therewith, any such solution may be configured to bond at least two compounds at a molecular level, thereby enabling consumers to selectively create formulation having a high quality and being specifically suited to his or her needs.

SUMMARY OF THE INVENTION

The present invention is intended to present a solution to these and other needs which remain in this field of art. As such, various embodiments of the present invention are directed to a device, system, and/or method configured to store, process, and dispense at least one formulation, which itself may comprise a single compound or a combination of at least two different compounds. Accordingly, at least one embodiment of the present invention is directed to a processor-applicator apparatus which may comprise various elements and structures configured to provide the foregoing functions.

For example, at least one embodiment of the present invention may comprise a processor-applicator assembly, which may comprise a housing having a foundation end and a summit end. Such a housing may comprise a base structure at its foundation end, the latter of which may be construed as the bottom end—i.e., the end which may be supported on a table or some other structure. As such, in at least one embodiment of the present invention, such a base structure may comprise a flat bottom, which may itself have one or more contact points disposed thereon. Such contact points may comprise, for instance, raised portions, adhesive portions, a combination thereof, or some other structure configured to provide greater interaction between the processor-applicator system and the support structure upon which the same may rest. At the summit end, in contrast, such a housing end may comprise an applicator system, which will be discussed in greater detail hereafter.

In at least one embodiment of the present invention, such a housing may comprise an intermediate section disposed between the foundation end and the summit end. Such an intermediate section may comprise a hollow structure and may comprise any shape suitable for the processor-applicator system described herein. For instance, at least one embodiment of such intermediate section may comprise an at least substantially cylindrical hollow tube. However, alternative embodiments of the intermediate section may instead comprise a substantially square, rectangular, hexagonal, octagonal, or any other shape deemed suitable therefor.

In connection with the foregoing, it may be understood such intermediate section may comprise an outer wall and an inner wall. Such outer wall may be configured to face in a direction radially distal to the central axis of such intermediate section. In contrast, such inner wall may be inner facing, and thus may form an intermediate chamber therein. As may be understood, such intermediate chamber may be configured for receipt of at least one, and in some embodiments a plurality of different and/or disparate elements. In view thereof, it may be understood such intermediate chamber may, in certain embodiments, be bifurcated, divided, or otherwise comprise various sections configured for the receipt of various elements, whether through physical walls or dividers or otherwise.

For instance, in at least one embodiment of the present invention, such an intermediate section, and particularly such intermediate chamber may have at least one central chamber formed therein. In at least one such embodiment, such a central chamber may be formed along the line of symmetry and/or central axis of such intermediate chamber. In various embodiments, such central chamber may be configured to house a variety of components of the present invention. And, as with the intermediate chamber, such central chamber may, in certain embodiments, be bifurcated or separated, or otherwise configured for the receipt of various, distinct elements of the present invention.

In connection with the foregoing, the central chamber of at least one embodiment of the present invention may form two distinct sections, namely: (1) a vibration chamber, configured for the disposition of at least one vibratory source disposed therein; and (2) a projectile chamber, configured for the disposition of a plurality of projectile elements therein. Each of these chambers, and the various elements disposed therein, shall be discussed in greater detail hereafter.

As previously discussed, at least one embodiment of the central chamber of the present invention may comprise a vibration chamber, which itself may be configured to house at least one vibratory source therein. Such a vibratory source may comprise, for instance, a vibration motor or some other component configured to vibrate at a frequency and amplitude sufficient for the applicator described herein. Such a vibration motor may comprise, for instance, an eccentric rotating mass vibration motor, and may optionally be brushless for improved life expectancy. Conversely, such a vibratory source may instead comprise a linear resonant actuator or a solenoid actuator, or alternatively any other component configured to generate a vibratory movement upon application of electrical energy thereto, whether now known or hereafter developed. As may be understood, in various embodiments incorporating such a vibratory source, the same may be electrically connected to an energy source. Such an energy source may be disposed within the base structure previously recited herein, or alternatively may be disposed within the central chamber or some other structure of the housing.

As previously stated, such central chamber may further comprise a projectile chamber configured to house a plurality of projectile components therein. Such projectile components may be disposed within such projectile chamber in an unsecured orientation, such that each of the projectile components may freely move about such chamber. Accordingly, it may be understood such projectile components may be configured for kinetic movement akin to gas particles—i.e., such projectile components, upon the application of kinetic energy to the projectile chamber, may be configured for constant, random motion, wherein such projectile components may continually collide with one another as well as with the interior walls of the projectile chamber. Accordingly, it may be understood the plurality of projectile components may thus be configured in bombarding orientation in connection with the interior walls of the projectile chamber, meaning that the projectile components may continuously flow, attack, and collide with such interior walls, thereby collectively filling the entirety of volume present within such vibration chamber.

In at least one embodiment of the present invention, such projectile components may comprise metal ball bearings, which may themselves comprise various sizes, materials, and/or densities dependent upon the size and/or function of the processor-applicator system described herein. For instance, such projectile components may be made of steel, such as high carbon chromium steel, copper, or alternative materials, such as plastic or ceramics. Alternatively, such projectile components may instead comprise some other similarly situated element provided such element is configured for the function thereof, which may require specified densities and other material properties pertaining to, for instance, durability. Although the projectile components described herein are round and/or spherical in nature, it should be understood alternative shapes of such projectile components may be used as well.

For example, in at least one embodiment of the present invention, such projectile chamber may have approximately thirty-five metal ball bearings disposed within therein, which may constitute the projectile components. In such an embodiment, such projectile components may be spherical in nature, and may comprise a diameter in the range of approximately one millimeter to two millimeters. As may be understood, such an embodiment is merely exemplary, as alternative sizes and numbers of projectile components are envisioned herein.

Returning to the intermediate chamber, various embodiments thereof may be configured for the receipt of alternative components therein. For instance, in at least one embodiment of the present invention, such intermediate chamber may be configured for the disposition of at least one cartridge therein, wherein such cartridge may house at least one compound. Such at least one cartridge may be disposed proximate to the summit end of the housing, such that the cartridge, and specifically the compound(s) disposed therein, may be configured in fluid communication with the applicator system. As may be understood, various embodiments of the intermediate chamber of the present invention may be configured for receipt of a varying number of cartridges. For instance, the intermediate chamber of at least one embodiment of the present invention may be configured to house two such cartridges; however, alternative embodiments thereof may be configured to house three, four, or more such cartridges. As may be understood, in at least one embodiment of the present invention, such intermediate chamber may comprise at least one retaining structure, configured for sliding engagement with such cartridge(s). As such, the cartridge(s) may thus be removably secured within such intermediate chamber, while enabling the same to be removed therefrom by a user. Alternatively, such a cartridge may be removably secured through some other means, such as with fasteners or other similarly situated mating components.

Disposed within each such cartridge may be one or more compounds. Given the aforementioned removable functionality of such cartridge(s), it may be understood such compound(s) may be directed towards a plurality of fields of use, including, without limitation, pharmaceuticals, cosmetics, beverages, and foodstuffs. Consequently, such compounds may comprise numerous different chemical compounds applicable to such fields. For instance, compounds relating to the field of pharmaceuticals may comprise immediate reactive compounds, such as antacids, or natural compounds relating to anti-fungal treatments or wound healing treatments. Cosmetics, in contrast, may instead comprise color compounds and/or blends relating to make-up, skin treatments, or hair treatments. With respect to foodstuffs and beverages, such compounds may instead comprise flavor compounds, such as spices and herbs.

In at least one embodiment of the present invention, such cartridge(s) may be configured to abut the central chamber disposed within such intermediate chamber. More specifically, such cartridge(s) may be configured to abut the projectile chamber. As such, it may be understood any kinetic energy imparted onto the walls of the projectile chamber by the plurality of projectile components disposed therein may thus be transferred to the cartridge(s), and thereby the compound(s) disposed therein.

Even further, such cartridge(s) may further be configured to abut at least one vibratory component, which may also be disposed within the intermediate chamber, albeit below such cartridge(s), such that the vibratory component(s) are configured proximate to the foundation end of the housing. Such vibratory component(s) may comprise, for instance, metal coil springs, or some other structure configured to vibrate and/or oscillate in a side-to-side motion upon the application of vibratory kinetic energy thereto.

In view thereof, it may be understood such at least one vibratory component may be configured in mechanical relation to the vibratory source previously discussed herein. In so doing, the vibratory kinetic energy generated by the vibratory source may simultaneously be imparted to the vibratory component(s) along with the projectile chamber. Accordingly, it may be understood the vibratory source thus confers the following: (a) the bombarding orientation of the projectile elements disposed within the projectile chamber; and (b) the vibratory and/or oscillatory motion of the vibratory elements. Thus, due to the abutting relation of the cartridge(s) with both the projectile chamber and the vibratory elements, it may be understood the cartridge(s) may therefore be exposed to two different forms of kinetic energy. One such form of kinetic energy comprises the oscillatory motion imparted on the underside of the cartridge(s) by the vibratory element(s), thereby causing the cartridge(s) to shake back-and-forth. The other such form of kinetic energy instead comprises the bombardment energy resulting from the projectile elements disposed within the projectile chamber, which itself results in an irregular application of kinetic energy upon varying portions of the cartridge(s).

In accordance therewith, the foregoing forms of kinetic energy imparted upon the cartridge(s) thus imparts kinetic energy upon the compounds stored therein. Specifically, the first form of such kinetic energy—i.e., the oscillatory motion—results in a sifting function, wherein the heavier, larger, and/or more dense particles of such compound may fall and settle towards the bottom of such cartridge, whereas the lighter, smaller, and/or less dense particles instead rise towards the top of the mass of the compound. Accordingly, such sifting function may be construed as sorting or otherwise separating the smaller particles from the larger particles.

In contrast, the second such form of kinetic energy imparted onto the cartridge(s)—i.e., the bombardment energy resulting from the barrage of projectile elements against the walls of the projectile chamber—results in a fracking function, wherein the lighter, smaller, and/or less dense particles of the compound stored within such cartridge are extracted from the confines of the cartridge and thereby removed into the applicator system at the summit end of the housing. More specifically, the continual and irregular bombardment energy imparted on the cartridge by the plurality of projectile elements causes such lighter, smaller, and/or less dense particles to periodically rise above the remaining mass of the compound. Accordingly, the term "fracking" as used herein, as well any variants thereof, specifically refers to this phenomenon—i.e., causing and/or resulting in the smaller, lighter, and/or less dense particles to rise above the remaining mass of the compound.

Concurrent with the sifting function and the fracking function imparted onto the compound disposed within such cartridge(s), the processor-applicator system of at least one embodiment of the present invention may be configured to withdraw such lighter, smaller, and/or less dense particles from the cartridge and into the applicator assembly at the summit end of the housing. For instance, at least one embodiment of such an applicator assembly may comprise a separator component functioning akin to a lid, wherein the same is placed upon the cartridge(s) in sealing relation thereto. Such separator component may have at least one pathway therethrough, which may comprise an opening, aperture, or other like structure configured to place the cartridge and a reservoir within the applicator assembly in fluid communication. Accordingly, it may be understood such applicator assembly may be configured to withdraw such compound from such cartridge(s), through such pathway(s), and into such reservoir via the application of a suction force therethrough. Various embodiments of the applicator assembly of the present invention may utilize various means to effectuate such a suction force.

For instance, one embodiment of the present invention may effectuate such a suction force via a bulb assembly. Specifically, such a bulb assembly may comprise a bulb component, which may form the reservoir previously recited herein. As may be understood, such bulb component may be consecutively depressed and reinflated, thereby expelling air from the same, refilling the same with air, and then expelling the same once again. In so doing, it may be understood a user may expel air residing within the chamber upon depressing the bulb component. Upon removing the force from the bulb component, the bulb component may then be predisposed to reinflate, thereby drawing air therein. However, due to the fluid communication between such reservoir and such cartridge(s), it may be understood the air drawn into such reservoir may further comprise at least an amount of the compound disposed within such cartridge, and specifically, the smaller, lighter, and/or less dense particles thereof. Then, upon a subsequent depressing of the bulb component, the air disposed within such reservoir, as well as the amount of the compound disposed therein, may thus be expelled from such reservoir.

In accordance therewith, it may be understood the reservoir of such bulb component may similarly be configured in fluid communication with at least one applicator outlet. Such applicator outlet(s) may optionally be disposed in connection with an applicator attachment, such that the compound withdrawn into the reservoir and expelled therefrom exits the bulb component through the applicator outlet(s) and, ultimately, the applicator attachment. Such an applicator attachment may comprise a plurality of different structures such as, without limitation, a brush, a nozzle, a spout, a roller assembly, or any structure deemed appropriate for applying a compound and/or a formulation according to composition thereof and/or the intended use thereof.

The applicator assembly of alternative embodiments of the present invention may instead use different means and mechanisms to effectuate the aforementioned withdrawal and ultimate expulsion of the compound from the cartridge and out of the applicator outlet(s). For instance, in one such an embodiment, such applicator assembly may instead comprise a fan assembly configured to effectuate an airflow from the cartridge, through the reservoir, and out of the applicator outlet(s). Such a fan assembly may comprise, for instance, at least one fan component configured in connection with at least one fan energy source, which may comprise, for instance, a battery. Such fan assembly may be operable by a user via, for instance, at least one fan switch formed on the exterior of such applicator assembly, wherein such a fan switch may comprise a button or some other like structure.

As may be understood, because various embodiments of the present invention may be configured such that at least two, and in some instances a plurality of cartridges are disposed within the intermediate section of the housing at any given time, it may be preferable that the compounds disposed within such cartridges be mixed prior to application, thereby generating a formulation to be expelled from the inventive processor-applicator disclosed herein. As such, it should be understood the concurrent, but separate withdrawal of each such compound into the reservoir of the applicator assembly may effectuate such a mixing. Alternatively put, as the disparate compounds disposed within disparate cartridges are withdrawn into the reservoir, such disparate compounds may fuse together, in part due to the turbulent airflow generated within such reservoir. As such, any formulation ultimately expelled from the applicator outlet(s) may comprise a mixture and/or fusing of each such compound. More specifically, due at least to the sifting and/or fracking functions imparted on each compound, which results in the withdrawal of the smallest, lightest, and/or least dense particles to be withdrawn into such applicator assembly, such compounds may thus be predisposed for molecular bonding when combined through such turbulent airflow present within such applicator assembly.

However, it should be noted that even when at least two, or a plurality of cartridges are disposed within the intermediate section of the housing of the inventive processor-applicator system disclosed herein, it may nonetheless be preferable for a user to only expel a single compound therefrom. As such, it may be understood the applicator system of at least one embodiment of the present invention may be configured for divisible expulsion, such that each compound disposed within any one cartridge may be expelled from the applicator system absent the compounds disposed within any other cartridges.

In accordance with the foregoing, the applicator system of various embodiments of the present invention may comprise certain means configured to effectuate such divisible expulsion. For instance, in those embodiments wherein such applicator assembly comprises a bulb assembly, it may be understood such bulb component may be segmented, such as to a number equivalent to the number of cartridges disposed within the intermediate section of the housing. As such, depression of each segmented portion of the bulb component may individually effectuate the withdrawal of the compound disposed within such cartridge. Likewise, for those embodiments wherein the applicator assembly comprises a fan assembly, it may be understood each fan component may be individually actuatable, such as through an associated independent fan switch, such that each fan may effectuate a singular airflow from a single cartridge to the reservoir. In this manner, it may be understood individual compounds from individual cartridges may be withdrawn into the reservoir of the applicator assembly, thereby providing a user with the ability to selectively apply certain compounds at his or her whimsy.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description, as taken in connection with the accompanying drawings, in which.

Like reference numerals refer to like parts throughout the several views of the drawings.

DETAILED DESCRIPTION

In at least one embodiment, the present invention is directed towards a processor-applicator system configured to process a compound 125', or perhaps a plurality of compounds 125', into a formulation to be dispensed therefrom. In general terms, such a processor-applicator system may comprise a housing 100, configured for the disposition of at least one cartridge 125 therein, wherein such a cartridge 125 may have an amount of a compound 125' stored therein. Such compound 125' may ultimately be processed by various components of the processor-applicator system in order to generate a formulation to be expelled from the same. As may be understood, the processor-applicator system described herein may be used in connection with a variety of compounds 125', and for a variety of different fields of formulation including, without limitation, cosmetics, pharmaceuticals, beverages, and foodstuffs.

Figure 1:
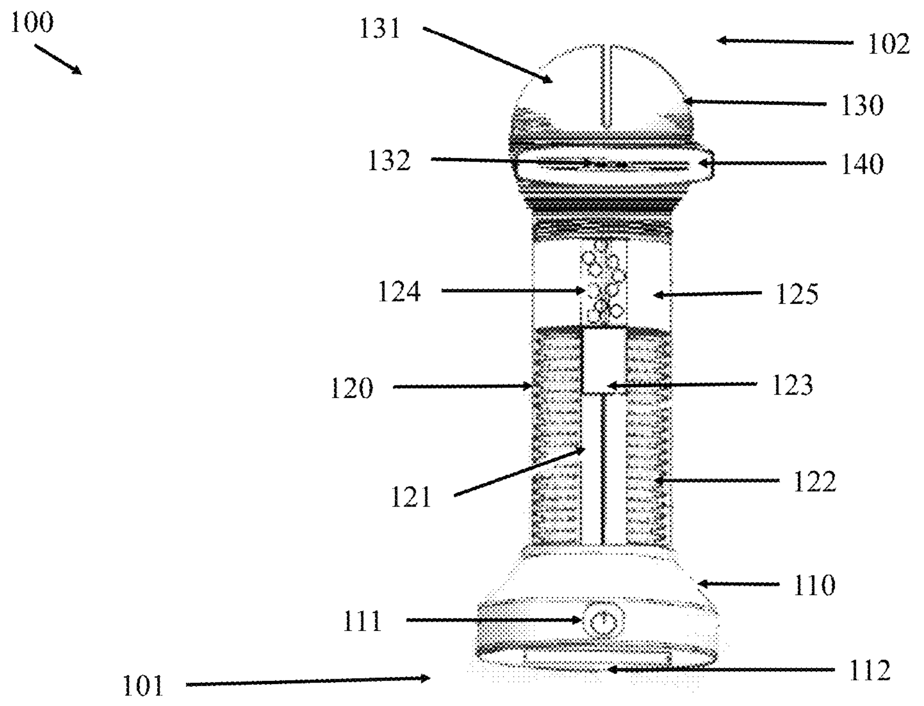
FIG. 1 is directed to a front, and at least partially cross-sectional view of a processor-applicator system, in accordance with at least one embodiment of the present invention.

For example, as depicted in FIG. 1, such a processor-applicator system may be formed of a housing 100 comprising a foundation end 101 and a summit end 102. Disposed at such foundation end 101 may be a base structure 110; conversely, disposed at such summit end 102 may be an applicator assembly 130. And, disposed between such base structure 110 and such applicator assembly 130 may be an intermediate section 120. In various embodiments of the present invention, such base structure 110, applicator assembly 130, and intermediate section may be formed of one integral part, or of a plurality of parts configured in removable engagement through fastener elements and/or other connective structures, whether comprising separate screws and the like, or integrally formed threads and such.

With continued reference to FIG. 1, such a base structure 110 may be configured for engagement with a support surface, such as a table, shelf, or counter. For instance, such a base structure 110 may, in at least one embodiment, comprise a flat bottom, optionally with at least one contact point disposed thereon, in order for the housing 100 described herein to remain in an upright orientation when disposed on such a support surface.

Even further, such a base structure 110 may be configured to house, for instance, at least one energy source 112. Such at least one energy source 112 may be configured in electrical communication with a plurality of components of the processor-applicator system described herein, as will be discussed in greater detail hereafter. Such an energy source 112 may comprise a variety of components configured to provide electrical energy to other components such as motors and the like. Accordingly, such an energy source 112 may comprise various types of batteries, whether primary or secondary, whether removable or permanent, and whether now known or hereafter developed. In various embodiments, it is envisioned such energy source 112 may be composed of a variety of chemical compositions and of varying sizes capable of providing various loads at varying voltages.

In connection therewith, it may be understood the base structure 110 in accordance with at least one embodiment of the present invention may further comprise a power button 111 configured to form a complete electrical circuit between the at least one energy source 112 and the remaining elements of the processor-applicator system disposed herein. Such a power button 111 may comprise an actuation button, a sliding switch, or any other similar structure now known or hereafter developed.

With further reference to FIG. 1, and additional reference to FIGS. 2A-3B, it may be seen the intermediate section 120 may extend between the aforementioned base structure 110, disposed at the foundation end 101 of the housing 100, and the applicator assembly 130, disposed at the summit end 102 of the housing 100. Such an intermediate section 120 may, in at least one embodiment of the present invention, be configured to house, or otherwise receive a plurality of different components configured for the processing and expelling functions of the processor-applicator system described herein. As previously discussed, such an intermediate section 120 may, in certain embodiments, be bifurcated and/or divided into certain sections for the receipt of various components, whether wholly or partially, or may otherwise be configured for the receipt of certain elements within certain positions. Accordingly, as used herein, any use of the term "section" or "chamber," when discussing the intermediate section 120, does not necessarily impart a meaning that such section or chamber is wholly divorced from the remaining portions of the intermediate section 120, such as through a wholly enclosed volume or space. Rather, such terms merely convey a portion of the intermediate section 120 configured for the receipt and/or housing of specified components of the processor-applicator system defined herein, and as may be understood, may comprise certain structures, such as grooves or protrusions, configured to secure such specified components therein.

In view thereof, such intermediate section 120 may comprise an outer wall and an inner wall, the latter of which may serve to form an intermediate chamber 126 within such intermediate section 120. Such intermediate chamber 126 may be configured for the receipt of a plurality of different elements of the processor-applicator system described herein, and may, in accordance with the foregoing, be bifurcated, divided, or otherwise comprise varying sections for the receipt therefor.

For instance, as depicted in FIGS. 1-3B, the intermediate chamber 126 of the intermediate section 120 may have at least one central chamber 121 formed therein. In at least one embodiment of the present invention, such central chamber 121 may be formed along the line of symmetry and/or the central axis of such intermediate chamber 126. Varying embodiments of such a central chamber 121 may be configured to house a variety of components of the present invention. For example, in at least one embodiment of the present invention, such central chamber 121 may form two distinct sections, namely: (1) a vibration chamber 123, which may be configured for the disposition of at least one vibratory source 123' therein; and (2) a projectile chamber 124 configured for the disposition of a plurality of projectile elements 123' therein. Each such chamber, and the components disposed therein, shall be discussed in greater detail hereafter.

As previously discussed, the central chamber 121 of at least one embodiment of the present invention may comprise a vibration chamber 123, into which at least one vibratory source 123' may be disposed. Such a vibratory source 123' may comprise, for instance a vibration motor or some other similar components, such as an eccentric rotating mass vibration motor, a linear resonant actuator, a solenoid actuator, or a plurality and/or combination thereof, wherein such a vibratory source 123' may be configured to generate a vibratory and/or oscillatory movement upon the application of electrical energy thereto. As may be understood, such a vibratory source 123' may be configured in electrical communication with the at least one energy source 112, whether disposed in the base structure 110 of the housing 100 or otherwise. And, as will be discussed in greater detail hereafter, such a vibratory source 123' may be configured in mechanical relation with other components disposed within the intermediate section 120 in order for such vibratory and/or oscillatory movement to be imparted on the same, such as through the disposition thereof in abutting relation with such other components.

Conversely, such a central chamber 121 may further comprise a projectile chamber 124, into which a plurality of projectile elements 124' may be disposed. In at least one embodiment, such projectile chamber 124 may abut the vibratory source 123', or otherwise the vibration chamber 123, such that any vibratory and/or oscillatory movement generated by such vibratory source 123' may be imparted on the projectile chamber 124, and thus the projectile elements 124' disposed therein. Such projectile elements 124' may be disposed within the projectile chamber 124 in an unsecured orientation, such that each of the projectile elements 124' may freely move about the projectile chamber 124.

In so doing, it may be understood the plurality of projectile elements 124' may be configured for kinetic movement and may function similarly to gas particles in that each projectile element 124' may freely and constantly move throughout the volume of space enclosed within the projectile chamber 124. In so doing, it may be understood such projectile elements 124' may continually collide with one another, as well as continually collide with the interior walls of the projectile chamber 124. As such, it may be understood the plurality of projectile elements 124' may be configured in bombarding orientation within the projectile chamber 124. As used herein, the term "bombarding orientation" refers to such kinetic movement of the plurality of projectile elements 124'—i.e., that the projectile elements 124' may move in continual, random motion wherein such projectile elements 124' may move in all directions, reach all spaces of volume of the projectile chamber 124, and may collide both with each other and with the walls of the projectile chamber 124. As such, it may be understood the disposition of such projectile elements 124' in bombarding orientation may result in the transfer of kinetic energy, which may be rhythmic or arrhythmic, from the projectile elements 124' through the walls of the projectile chamber 124, and upon any structures or elements in mechanical relation thereto.

In at least one embodiment of the present invention, such projectile components 124' may comprise metal ball bearings of varying sizes, materials, and/or densities, which may depend upon, for instance, the size and/or intended function of the processor-applicator system described herein. For example, in one such embodiment, such projectile components 124' may comprise an amount of approximately thirty-five metal ball bearings having a spherical nature with a diameter in the range of approximately one millimeter to two millimeters. However, it may be understood such an embodiment is merely exemplary, as alternative compositions of such projectile components 124' are envisioned herein, whether comprising a non-metallic material composition, alternative or non-spherical shapes, varying densities or other material properties, or alternative sizes whether pertaining to diametric size or otherwise. For instance, it may be understood such projectile components 124' may require certain sizes, weights, and/or properties dependent on the kinetic energy requirements of the processor-applicator system defined herein.

Figure 2A:
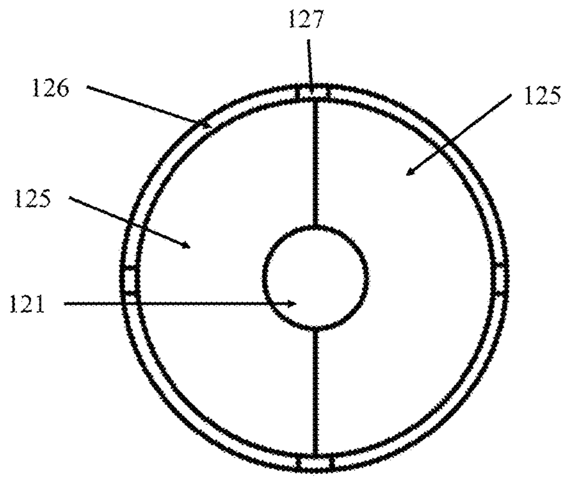
FIG. 2A is directed to a top view of an intermediate chamber having two cartridges removably secured therein, in accordance with at least one embodiment of the present invention.
Figure 2B:
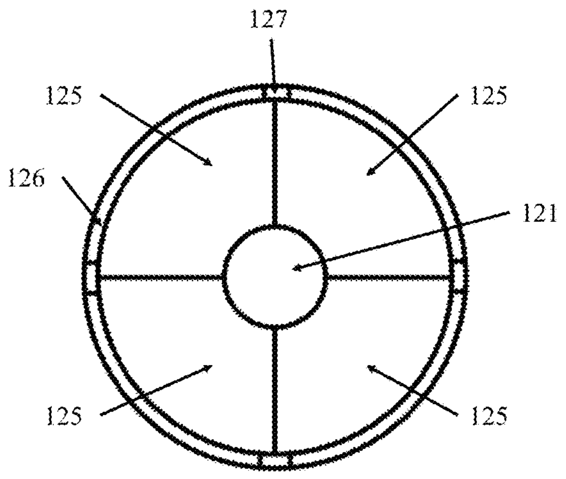
FIG. 2B is directed to a top view of an intermediate chamber having four cartridges removably secured therein, in accordance with at least one embodiment of the present invention.

Such an intermediate section 120 may further be configured for the disposition of a plurality of alternative components therein. For instance, in the embodiments depicted in FIGS. 1-3, such an intermediate section 120 may be configured for the receipt of at least one cartridge 125. However, as depicted in FIGS. 2A-2B, it may be understood such an intermediate section may instead be configured to receive at least two, and in some instances, a plurality of cartridges 125, whether amounting to two, four, or some other number. Such cartridge(s) 125 may be configured to house at least one compound 125'. For example, such a compound 125' may comprise something pertaining to cosmetics—e.g., micro-compounds relating to hair color, hair treatments, skin and/or scalp treatments, hair building materials, and sunblock formulations—pharmaceuticals—e.g., compounds relating to deodorants, antifungal treatments, or skin treatments —, or even beverages and/or foodstuffs—e.g., spices, food coloring, and sugar. However, it may be understood numerous types of compounds of varying chemical compositions are envisioned herein. Moreover, it may be understood such compound(s) 125' may be disposed in varying levels of composition, such as a natural form, a crushed or blended form, and a pulverized form, although other such compositions are envisioned herein as well.

Figure 4:
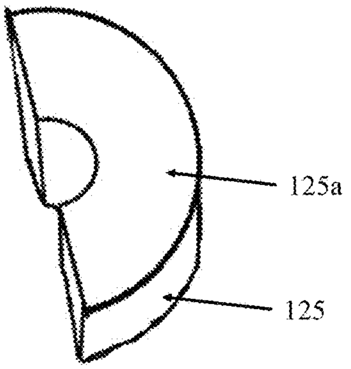
FIG. 4 is directed to a top view of a cartridge having a lid structure disposed thereon, in accordance with at least one embodiment of the present invention.

In accordance therewith, such cartridge(s) 125 may be configured for removable disposition within such intermediate section 120, thereby enabling a user to remove one such cartridge 125 and replace the same with a cartridge 125 housing an alternative compound 125'. To facilitate the same, the intermediate section 120 of at least one embodiment of the present invention, such as the ones depicted in FIGS. 2A and 2B, may comprise at least one retaining structure 127, such as grooves or projections configured to matingly engage with similar structures found on the cartridge(s) 125, or to otherwise support the cartridge(s) 125. Further, as depicted in FIG. 4, such cartridge(s) may be structured for connection with a lid structure 125*a*, which may form a seal preventing the compound 125' disposed therein from escaping during storage, transportation, or otherwise.

In at least one embodiment of the present invention, such cartridge(s) 125 may be configured in abutting relation to the projectile chamber 124. As such, it may be understood any kinetic energy transferred onto the projectile chamber 124 by the projectile elements 124' disposed therein may thus be imparted onto the cartridge(s) 125. This structural arrangement, and the functionality following therefrom shall be discussed in greater detail hereafter.

Returning to the intermediate section 120, at least one embodiment thereof may further be configured for the receipt of at least one vibratory component 122'. Such a vibratory component 122' may, in at least one embodiment of the present invention, be disposed below the cartridge(s) 125, and abutting the vibration chamber 123, such that the same is configured proximate to the foundation end 101 of the housing 100. Such a vibratory component 122' may comprise, for instance, metal coil springs or any other structure configured to vibrate and/or oscillate in a side-to-side motion upon the application of vibratory kinetic energy thereto. In conjunction therewith, such vibratory component(s) 122' may be mechanically engaged with the cartridge(s) 125 in at least one embodiment of the present invention, such that the aforementioned vibratory and/or oscillatory motion created by the vibratory component(s) 122' may be imparted onto the cartridge(s) 125. Further, as may be understood, in embodiments wherein the intermediate section 120 comprises a plurality of cartridges 125, the same may also house an equivalent number of vibratory components 122'. Alternatively, it is envisioned only a single vibratory component 122' may be used in connection with a plurality of cartridges 125, or any other combination thereof.

In view of the foregoing, it may be understood the kinetic energy generated by the vibratory source 123' may thus be imparted on the cartridge(s) 125 through both the vibratory component(s) 122' and the plurality of projectile components 124' disposed within the projectile chamber 124. Specifically, the projectile components 124', given their bombardment orientation within the projectile chamber 124 may, as a result of the kinetic energy provided by the vibratory source 125, continually bombard the projectile chamber 124, thereby imparting kinetic energy onto the cartridge(s) 125 disposed in abutting relation thereto. In contrast, the vibratory source 123' instead imparts vibratory and/or oscillatory motion on the vibratory component(s) 122', which thereby impart the same kinetic energy onto the cartridge(s) 125 likewise disposed in abutting relation thereto.

Figure 3A:
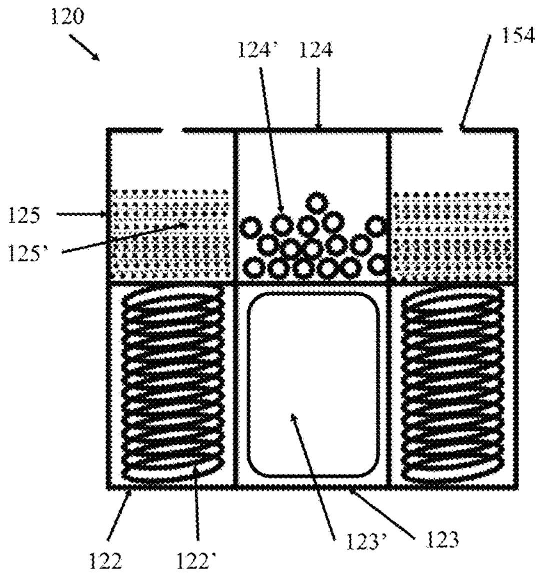
FIG. 3A is directed to a cross-sectional view of an intermediate section in an initial orientation, in accordance with at least one embodiment of the present invention.
Figure 3B:
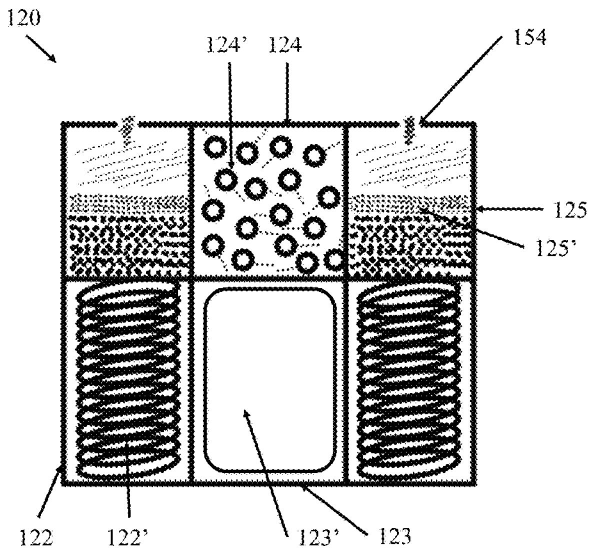
FIG. 3B is directed to a cross-sectional view of an intermediate section in a kinematically-dynamic orientation, in accordance with at least one embodiment of the present invention.

In so doing, and as depicted in FIGS. 3A-3B, the kinetic energy imparted on the cartridge(s) 125 via both the vibratory components 125' and the projectile chamber 124 may result in the application of a sifting function and a fracking function, respectively, upon the compound 125' disposed within the cartridge(s) 125. For reference, the compound 125' depicted in FIG. 3A may be construed as being in a mixed, initial state, wherein particles of varying size, as depicted via the dots of varying size, are mixed together, thereby forming an at least somewhat homogenous composition. And, with respect to FIG. 3B, it may be seen the small line of dots attached to the plurality of projectile elements 124' are intended to depict kinetic movement of the same along the same path of such line of dots.

In view thereof, FIGS. 3A and 3B depict the relevant elements of the processor-applicator system defined herein in an initial orientation and a vibratory and/or kinematically-dynamic orientation, respectively. And, as may be seen in such Figures, the sifting function and the fracking function imparted onto the compound 125' by the vibratory component(s) 125 and projectile elements 125' respectively, imparts specific changes to the compound 125'.

For instance, as may be seen with respect to FIG. 3B, such sifting function imparted upon the compound 125' by the vibratory component(s) 122' may result in the larger, heavier, and/or more dense particles of such compound 125' to fall to the bottom of the cartridge 125, as represented by the larger dots residing at the bottom portion of the cartridge 125. Conjunctively, such sifting function may result in the smaller, lighter, and/or less dense particles rising to the top of the mass of the compound 125', as represented by the smaller dots residing on top of the larger dots. As such, the sifting function may be construed as sorting or otherwise separating the smaller particles from the larger particles, and thus reducing the homogeneity of the compound 125', at least with respect to particle-size composition.

In conjunction therewith, the fracking function imparted on the compound 125' by the projectile elements 124' instead results in the separation of the lightest, smallest, and least dense particles of the compound from the remaining mass thereof. In other words, such particles may at least periodically rise above the remaining mass of the compound, as represented by the smaller dots forming a cloud-like mass above the remaining mass of the compound 125' within the cartridge 125. In so doing, such particles of the compound 125' may be more easily withdrawn from the cartridge 125, and into the applicator assembly 130 of the processor-applicator system described herein.

Accordingly, it may be understood the sifting function and the fracking function may combine to form an extraction process of the compound 125' from the cartridge 125 and into the applicator assembly 130. Even further, due to the manner in which such compound 125' is sifted and fracked prior to extraction, such compound 125' may easily blend with the compound(s) 125' of the remaining cartridge(s) 125 once extracted, thereby readily creating a well-blended formulation.

For example, the housing 100 of at least one embodiment of the present invention may comprise an applicator assembly 130 disposed at the summit end 102 thereof, wherein such applicator assembly 130 may be configured in fluid communication with the cartridge(s) 125 disposed within the intermediate section 120. As may be understood, the term "fluid communication" as used herein may refer to the ability of a fluid, gas, or solid to pass from one recited component to the other.

In at least one embodiment, such applicator assembly 130 may comprise a separator component 140, which may function to dispose the remaining portion of the applicator assembly 130 in fluid communication with the compound(s) 125' disposed within such cartridge(s) 125. More specifically, such separator component 150 may act as a lid separating the cartridge(s) 125 from the remaining structures of the applicator assembly 130. However, such a separator component 150 may comprise certain structures configured to enable the compound 125' to pass from the cartridge 125 and into the applicator assembly 130.

Figure 5:
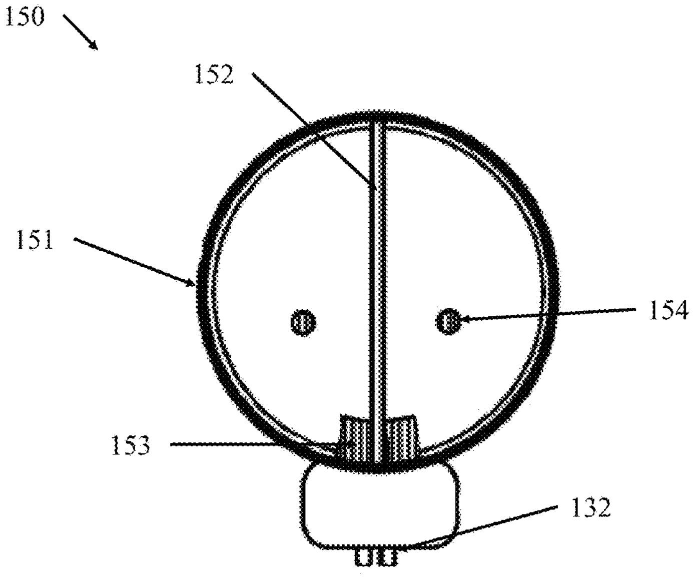
FIG. 5 is directed to a top view of a separator component, in accordance with at least one embodiment of the present invention.

For instance, as depicted in FIG. 5, one embodiment of such a separator component 150 may comprise a sealing structure 151, such as threads or some other similar structure configured to place the sealing structure 151 in removable, sealing engagement with the intermediate section 120. Such a separator component 150 may further comprise at least one, and in some instances a plurality of pathways 154, such as an opening, aperture, or other like structure configured to place the cartridge 125 and the applicator assembly 130 in fluid communication. In conjunction therewith, such a separator component 150 may comprise a dividing structure 152, such as a wall, which may be configured to align with the cartridge(s) 125. In other words, such a dividing structure 152 may be configure such that each cartridge 125 is acted upon individually. Thus, it may be understood such a dividing structure 152 may comprise one linear wall, two intersecting walls, or any other orientation dependent upon the number of cartridges 125 disposed within the intermediate section 120. Further, such a separator component 150 may additionally comprise at least one airway channel 153, which may be configured to provide airflow to the applicator assembly 130. As may be understood, the number of pathways 144 and airway channels 143 may, in at least one embodiment, be equivalent to the number of cartridges 125 disposed within such intermediate section 120, such that each cartridge 125 is acted upon via one distinct pathway 154 and/or airway channel 153.

In conjunction therewith, such applicator assembly 130 may comprise certain structures configured to withdraw such compound 125' from the cartridge 125 in which it resides, and subsequently mix the same with other compounds 125' disposed in alternative cartridges 125 thereby creating a formulation, and subsequently expel such formulation from the housing 100. As may be understood, alternative embodiments of the present invention may comprise alternative embodiments of the applicator assembly 130, such as embodiments configured for manual operation and/or automatic operation. As such, it may be understood the embodiments of the applicator assembly 130 described herein are merely exemplary, as alternative structures are envisioned herein.

For example, in the embodiment depicted in FIG. 1, such applicator assembly 130 may comprise a bulb assembly configured to withdraw such compound 125' from a cartridge 125 and expel a formulation. Specifically, such a bulb assembly may comprise a bulb component 131 forming a reservoir therein, wherein such reservoir may be configured for the receipt of air and/or some other gaseous medium, as well as at least one, and in some instances a plurality of compounds 125' therein. As such, it may be understood such bulb component 131 may be configured for the consecutive depression and reinflation thereof, which may effectuate the consecutive expelling of air and refilling of air, respectively. In so doing, and due to the fluid communication established between the cartridge(s) 125 and the applicator assembly 130 via the separator component 150, such depression and reinflation of such bulb component 131 may withdraw an amount of the compound 125' from each cartridge 125 into the reservoir, and subsequently expel the same therefrom. As may be seen with reference to FIG. 1, such bulb component 131 may, in at least one embodiment, be bifurcated, such that disparate portions thereof are independently actuatable.

Figure 6:
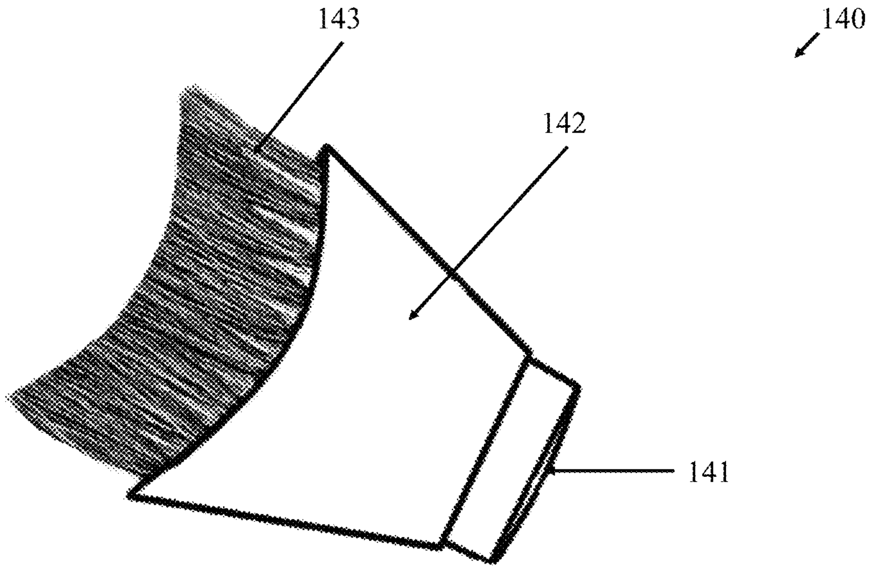
FIG. 6 is directed to an applicator attachment, in accordance with at least one embodiment of the present invention.

For instance, in at least one embodiment of the present invention, such bulb component 131 may be interconnected with at least one applicator outlet 132, through which a gaseous medium, the compound 125', and/or a formulation comprising a plurality of compounds 125' may be expelled therefrom. As shown in FIG. 1, such an applicator outlet 132 may be disposed in connection with an applicator attachment 140, which comprise a plurality of different structures including, without limitation, a brush or a nozzle. For example, one embodiment of such an applicator attachment 140 may be seen in FIG. 6, wherein such applicator attachment 140 comprises an attachment orifice 141 configured in fluid communication with the aforementioned applicator outlet(s) 132. Such applicator attachment 140 may further comprise a brush housing 142 having a bristle assembly 160 attached thereto. As may be understood, such attachment orifice 142 may be configured to receive the expelled compound 125' and/or formulation and expel the same through the bristle assembly 160.

Figure 7:
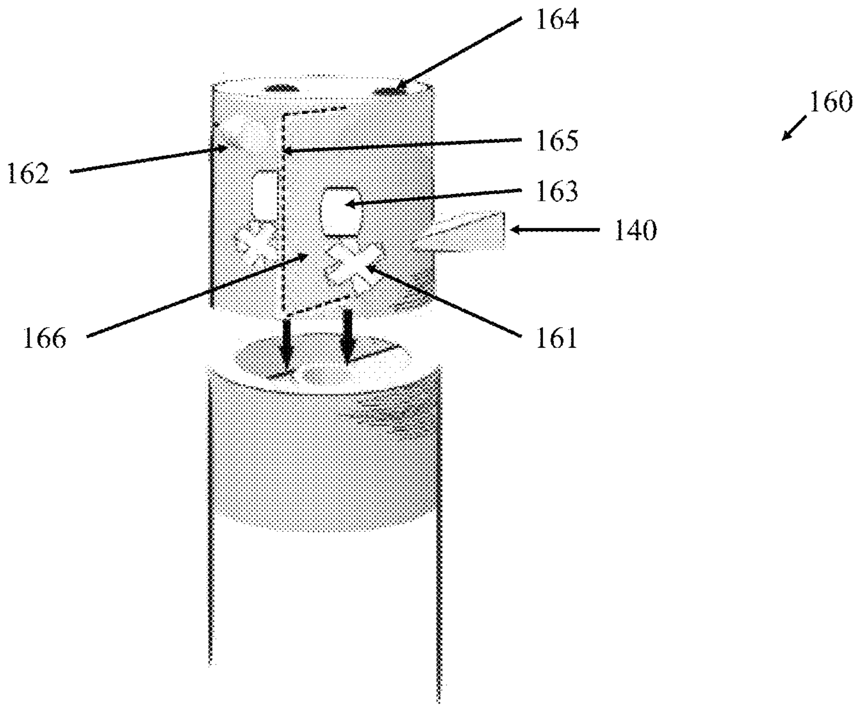
FIG. 7 is directed to an applicator assembly comprising a fan assembly, in accordance with at least one embodiment of the present invention.

In at least one alternative embodiment of the present invention, such an applicator assembly 130 may instead comprise a fan assembly 160 configured to automatically effectuate an airflow to withdraw the compound 125' from the cartridge 125 and expel the same from such applicator assembly 130. Specifically, as may be seen with reference to FIG. 7, such a fan assembly 160 may comprise at least one fan component 161 configured in connection with at least one fan motor 163, which may be electrically connected to at least one fan energy source 162. Alternatively, it may be understood such fan motor(s) 163 may instead be electrically connected to the energy source 112 of the housing 100, whether disposed in the base structure 110 thereof or otherwise.

As may be understood, such fan component(s) 161 may comprise a structure configured to rotate in order to direct airflow along a predefined path, such as one intended to create fluid communication between the cartridge(s) 125 and the applicator outlet(s) 132. Accordingly, such fan component(s) 161 may be configured to receive inflow from the cartridge(s) 125, and provide outflow through the applicator outlet(s) 132. Specifically, such fan component(s) 161 may comprise at least one revolving vane and/or blade configured to rotate upon power provided by the interconnected fan motor(s) 163. Such fan component(s) 161 may be actuated, either individually or in totality, via at least one actuation button 164.

In connection therewith, such a fan assembly 160 may comprise additional elements, particularly in those embodiments of the present invention featuring more than one cartridge 125 disposed within the intermediate section. Specifically, akin to the bulb assembly 130 discussed heretofore, such fan assembly 160 may similarly be configured to act upon individual cartridges 125, thus enabling a user to specifically withdraw only a single compound 125' into the fan reservoir 166 at a time. Alternatively, it may be understood the compound 125' disposed within each cartridge 125 may instead be concurrently withdrawn into the fan reservoir 166, and subsequently mixed therein, akin to the functionality of the aforementioned bulb assembly 130. For instance, such a fan assembly 160 may comprise an equivalent number of fan components 161 as the number of cartridges 125 disposed within such intermediate section. Hence, such fan assembly 160 may be configured such that each fan component 161 is applied to effectuate airflow in connection with one individual cartridge 125. In conjunction therewith, at least one embodiment of such a fan assembly 160 may further comprise at least one fan wall 165, which may be configured to separate the airflows generated by disparate fan components 161, such that each fan component 161 may withdraw air and/or a compound 125' from a single cartridge 125 without affecting the airflow of other fan components 161.

Notwithstanding, it may be understood alternative embodiments of the present invention may employ yet additional assemblies and/or structures to effectuate the withdrawal and expulsion of the compound(s) 125' from the cartridge 125. For instance, it is envisioned yet additional assemblies may comprise an aerosol assembly, a pump assembly, or any other similar assembly whether now known or hereafter developed.

In view of the foregoing, it may be seen the various embodiments of the present invention may be configured so as to both process a compound 125', which may be disposed in its most natural form, and subsequently combine the same with at least one alternative compound 125' to generate a formulation to be expelled from the processor-applicator system described herein. By maintaining such compounds 125' in their most natural form, and likewise providing users with the ability to selectively apply given compounds 125', whether through the interchangeability of the cartridges 125 housing such compounds, or through various means intended to provide fluid actuation upon a single cartridge 125, it may be seen users may use the processor-applicator system described herein for a plurality of uses, while avoiding the type of chemical compounds commonly utilized in similar systems to maintain a given compound 125' in an applicable chemical state.

Since many modifications, variations and changes in detail can be made to the described preferred embodiment of the invention, it is intended that all matters in the foregoing description and shown in the accompanying drawings be interpreted as illustrative and not in a limiting sense. For example, the various ranges given herein as the density of a material or for the depth of thickness of a section of the inventive tile should not be considered as the only possibilities. As another example, when using the words "preferably" or "in a preferred embodiment" and similar language, it is intended to mean one particular embodiment, and it should be appreciated that other embodiments are possible and considered part of the invention herein. Thus, the scope of the invention should be determined by the appended claims and their legal equivalents.

What is claimed is:

1. A processor-applicator system comprising:
a housing having a foundation end and a summit end;
said housing comprising a base structure at said foundation end and an applicator assembly at said summit end;
said housing further comprising an intermediate section disposed between said base structure and said applicator assembly;
said intermediate section comprising an intermediate chamber, said intermediate chamber having at least one central chamber formed therein;
said intermediate chamber configured for the receipt of at least one cartridge therein, said at least one cartridge having at least one compound disposed therein;
said intermediate chamber further configured for the receipt of at least one vibratory component therein, said at least one vibratory component disposed beneath said at least one cartridge;
said central chamber comprising at least one projectile chamber having a plurality of projectile elements disposed therein; and
said at least one cartridge configured in abutting relation to said at least one vibratory component and said projectile chamber, such that kinetic energy applied to each of said at least one vibratory component and said projectile chamber is imparted onto said at least one cartridge.

2. The processor-applicator system of claim 1, wherein said central chamber further comprises at least one vibratory source configured in mechanical relation to each of said at least one vibratory component and said projectile chamber.

3. The processor-applicator system of claim 2, wherein said at least one vibratory source comprises a vibration motor.

4. The processor-applicator system of claim 1, wherein said at least one vibratory component comprises a coil spring.

5. The processor-applicator system of claim 1, wherein said plurality of projectile elements comprises a plurality of ball bearings configured in bombarding orientation within said projectile chamber.

6. The processor-applicator system of claim 5, wherein said plurality of ball bearings are comprised of a metallic composition having a diameter within the range of approximately one millimeter to two millimeters.

7. The processor-applicator system of claim 1, wherein said applicator assembly comprises a bulb assembly.

8. The processor-applicator system of claim 1, wherein said applicator assembly comprises a fan assembly.

9. A processor-applicator system comprising:
a housing having a foundation end and a summit end;
said housing comprising a base structure at said foundation end and an applicator assembly at said summit, with an intermediate section disposed there between;
said intermediate section comprising inner walls forming an intermediate chamber configured for the receipt of at least one cartridge having at least one compound disposed therein, with at least one vibratory component disposed thereunder;
said intermediate chamber having at least one central chamber formed therein, said at least one central chamber housing at least one vibratory source;
said at least one central chamber further comprising a projectile chamber having a plurality of projectile elements disposed therein;
said at least one vibratory source configured to apply kinetic energy to each of said at least one vibratory source and said projectile chamber; and
said at least one cartridge disposed in mechanical relation to each of said at least one vibratory component and said projectile chamber, such that the kinetic energy applied to said at least one vibratory component and said projectile chamber is imparted on said at least one cartridge such that said at least one compound undergoes a sifting function and a fracking function.

10. The processor-applicator assembly of claim 9, wherein said at least one vibratory component comprises a coil spring.

11. The processor-applicator assembly of claim 9, wherein said plurality of projectile elements comprises a plurality of ball bearings configured in bombarding orientation within said projectile chamber.

12. The processor-applicator assembly of claim 9, wherein said applicator assembly comprises a bulb assembly.

13. The processor-applicator assembly of claim 9, wherein said applicator assembly comprises a fan assembly.

14. The processor-applicator assembly of claim 9, wherein said applicator assembly is individually actuatable.

15. The processor-applicator assembly of claim 9, wherein said at least one cartridge is removably secured within said intermediate chamber.

16. A processor-applicator assembly comprising:
a housing having a foundation end and a summit end;
said housing comprising a base structure at said foundation end and an applicator assembly at said summit end, with an intermediate section disposed there between;
said intermediate section configured for removable receipt of at least one cartridge having at least one compound disposed therein, said at least one cartridge configured in mechanical relation to at least one vibratory component;
said intermediate section further comprising a projectile chamber, said projectile chamber having a plurality of projectile elements disposed therein, said projectile chamber disposed in abutting relation to said at least one cartridge;
each of said at least one vibratory component and said projectile chamber configured in mechanical relation to at least one vibratory source;
said applicator assembly comprising a reservoir and at least one applicator outlet;
said applicator assembly further comprising a separator component configured to provide fluid communication between said at least one cartridge and said reservoir; and said applicator assembly configured to withdraw at least an amount of said at least one compound into said reservoir and expel said at least one compound through said at least one applicator outlet.

17. The processor-applicator assembly of claim 16, wherein said applicator assembly comprises a bulb assembly.

18. The processor-applicator assembly of claim 16, wherein said applicator assembly comprises a fan assembly.

19. The processor-applicator assembly of claim 16, wherein said at least one cartridge is disposed in mechanical relation to each of said at least one vibratory component and said projectile chamber, such that kinetic energy applied to said at least one vibratory component and said projectile chamber via said at least one vibratory source is imparted on said at least one cartridge such that said at least one compound undergoes a sifting function and a fracking function.

20. The processor-applicator of claim 16, wherein said plurality of projectile elements comprise metal ball bearings having a diameter within the range of approximately one millimeter to two millimeters.

* * * * *